United States Patent
Sun et al.

(10) Patent No.: US 9,971,371 B2
(45) Date of Patent: May 15, 2018

(54) METHOD FOR PREDICTING A VOLTAGE COLLAPSE IN A MICRO-GRID CONNECTED TO A POWER DISTRIBUTION NETWORK

(71) Applicant: Mitsubishi Electric Research Laboratories, Inc., Cambridge, MA (US)

(72) Inventors: Hongbo Sun, Plymouth, MN (US); Zhao Wang, Mishawaka, IN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 523 days.

(21) Appl. No.: 14/660,179

(22) Filed: Mar. 17, 2015

(65) Prior Publication Data
US 2016/0274606 A1 Sep. 22, 2016

(51) Int. Cl.
*G05F 1/625* (2006.01)
*G06N 5/02* (2006.01)

(52) U.S. Cl.
CPC ............. *G05F 1/625* (2013.01); *G06N 5/02* (2013.01)

(58) Field of Classification Search
CPC ................. H02J 3/14; H02J 3/24; G05F 3/02
See application file for complete search history.

(56) References Cited

U.S. PATENT DOCUMENTS

| | | | |
|---|---|---|---|
| 4,974,140 A | 11/1990 | Iba et al. | |
| 5,745,368 A | 4/1998 | Ejebe et al. | |
| 7,519,506 B2 | 4/2009 | Trias | |
| 7,979,239 B2 | 7/2011 | Trias | |
| 7,996,116 B2 | 8/2011 | Wiszniewski et al. | |
| 8,126,667 B2 | 2/2012 | Zhang et al. | |
| 2008/0212343 A1* | 9/2008 | Lasseter | H02J 3/30 363/39 |
| 2009/0085407 A1* | 4/2009 | Venkatasubramanian | G05F 1/70 307/98 |
| 2012/0098335 A1* | 4/2012 | Hell | H02J 3/24 307/18 |
| 2013/0066480 A1* | 3/2013 | Glavic | H02J 3/14 700/295 |

(Continued)

*Primary Examiner* — Thomas Lee
*Assistant Examiner* — Santosh R Poudel
(74) *Attorney, Agent, or Firm* — Gene Vinokur; James McAleenan; Hironori Tsukamoto

(57) ABSTRACT

A method predicts a voltage collapse in a micro-grid connected to a power distribution network by measuring states at a point of common coupling of the micro-grid, and a connected bus of the power distribution network connected to the micro-grid through a connection link. Then, it is determined whether a reactive power generation limit of the micro-grid is reached based on the states, and if no, repeating the measuring, and otherwise determining parameters of the connection link using the measurements. A static voltage stability margin index is determined, and a voltage stability margin index is predicted using the static voltage stability margin index and a forecast of future load variations in the micro-grid. Then, it is determined whether the voltage stability margin index is smaller than a threshold, and if no, repeating the measuring, determining and predicting steps, and otherwise if yes, signaling a control action indicating the voltage collapse.

19 Claims, 4 Drawing Sheets

(56) References Cited

U.S. PATENT DOCUMENTS

| | | | |
|---|---|---|---|
| 2014/0222227 A1 | 8/2014 | Wu et al. | |
| 2014/0244065 A1* | 8/2014 | Biswas | H02J 3/00 700/298 |
| 2015/0112498 A1* | 4/2015 | Patel | H02J 3/00 700/291 |
| 2015/0286227 A1* | 10/2015 | Watanabe | H02J 3/1878 323/340 |
| 2016/0380433 A1* | 12/2016 | Wang | G01R 31/40 307/130 |

* cited by examiner

METHOD FOR PREDICTING A VOLTAGE COLLAPSE IN A MICRO-GRID CONNECTED TO A POWER DISTRIBUTION NETWORK

FIELD OF THE INVENTION

The present invention relates generally to electric power networks, and more particularly to predicting a voltage collapse in a micro-grid connected to a power distribution network.

BACKGROUND OF THE INVENTION

A micro-grid is a localized grouping of electricity generation, energy storage, and loads that can be switchably connected to a conventional power distribution network (macro-grid). Generation and loads in the micro-grid are usually interconnected at low voltage. From the point of view of the grid operator, a connected micro-grid can be controlled as if it is one entity.

Micro-grids can improve power quality and reliability by organizing distributed generation (DG) units to provide power service locally. Therefore, micro-grids are mainly used to incorporate distributed energy resources to relieve power flows in current stressed power distribution networks. By combining generation, storage, and load devices, the micro-grid can either produce or consume electricity.

The micro-grid typically connects to a power distribution network through a single point of common coupling (PCC).

From the perspective of a power distribution network operator, the PCC can be either a generator bus, a load bus, or even disconnected when the micro-grid operates in stand-alone mode. As a load bus, if power consumption increases, then a voltage collapse can occur.

A power network enters a state of voltage instability when a change in system conditions causes an uncontrollable voltage decrease. Voltage instability is mainly caused by an inability of the power network to supply sufficient reactive power, such as in a stressed power network.

There is a growing concern about stressed power networks due to increasing electricity demand and an aging infrastructure. Furthermore, power distribution networks operate close to voltage stability limits when micro-grids are present, which complicate power flow. Because power distribution networks become more vulnerable to voltage collapse, distribution system operators need to detect and even predict an impending voltage collapse accurately and timely.

There are several methods available to assess static voltage stability in power networks, such as a critical load impedance method, a continuation power flow method, and a regular power flow based method.

The critical load impedance method predicts the voltage instability by measuring critical load impedances for load buses based on an equivalent circuit model derived using either model-based or measurement-based method.

U.S. Pat. No. 7,996,116 describes a model-based method that derives an equivalent circuit model by estimating states of the network. U.S. Pat. No. 8,126,667 describes a measurement-based method that decides a voltage stability margin based on synchronized phasor measurements from the entire power system. As an alternative, U.S. Pat. No. 5,745,368 describes a continuation power flow method that approximates a voltage versus power curve to determine the critical point. U.S. 20140222227 describes an improved continuation power flow method that claims to obtain a better approximation of the voltage versus power curve. There are also voltage stability detection methods that are based on power flow solutions. U.S. Pat. Nos. 4,974,140, 7,519,506 and U.S. Pat. No. 7,979,239 describe a procedure of examining power flow solutions using power flow analysis results of the entire power system.

For the above prior art methods, some level of approximation exists because required information is usually unavailable, or it takes time to obtain an accurate parameter estimation. Some of those methods use approximations to simplify the voltage stability prediction problem, such in continuation power flow methods.

Other methods require synchronized phasor measurements of the entire power network, but load buses generally do not have such equipment. In addition, solving parameter or state estimation problems for the entire power system takes time and may not converge. As a result, most of available methods cannot analyze real-time static voltage stability without requiring excessive information from a micro-grid-integrated power distribution network.

SUMMARY OF THE INVENTION

The embodiments of the invention provide method for predicting a voltage collapse in a micro-grid connected to a power distribution network. The predicting only uses local measurements at a point of common coupling (PCC) of the micro-grid, and a load or connection bus of the power distribution network that connected to the PCC through a transformer or transmission line. After determined the parameters or status of a connection link, such as the transformer's tap position in real-time, those measurements can be further used to predict an impending voltage collapse in a micro-grid integrated power distribution network. The invention defines a local stability detector that derives an accurate voltage stability index that can indicate when the power consumption in the micro-grid is likely to have a voltage collapse. If the index is small, then immediate control action are required. The voltage stability detector updates the index whenever a local measurement is available.

More importantly, the local detector makes a prediction of the voltage stability index after the micro-grid indicates a forecast of future load variations. On the basis of the real-time voltage stability prediction, local control is provided to ensure static voltage stability at each PCC. Furthermore, a global management system can be overlaid on the distributed detectors at buses in the micro-grid.

Instead of detailed phasor information, the global management system is able to use high-level voltage instability index to coordinate various micro-grids in a power distribution network. For example, if a micro-grid with a critical load is approaching voltage collapse, then the global manager can prevent disconnecting the critical load by connecting to other micro-grids that have surplus generation capacities or voltage control devices. Consequently, optimal operation can be achieved to improve voltage stability, and reduce load shedding cost.

Compared with prior art techniques, the real-time voltage stability predictor is accurate and easy to implement for a micro-grid integrated power distribution network. For continuation power flow, it is impossible to determine a searching direction without complete knowledge of all states in the power network.

If the global measurements are available, a new power flow analysis is required every time the network parameter changes, such as a tap change at any of the micro-grid connected transformers. Critical loadability conditions cannot be used in a realistic power network.

Model-based approaches require a time interval to obtain an accurate estimation of the impedance, but the power network can change during the interval. Measurement-based methods require synchronized phasor measurements of the entire power network, which are unavailable in the realistic power distribution network.

In contrast, the voltage stability index according to embodiments of the invention can be determined in real-time so that impending voltage collapse is predicted in a timely manner.

DETAILED DESCRIPTION OF THE PREFERRED EMBODIMENTS OF THE INVENTION

Micro-grid-integrated Power Distribution Network

Figure 1:
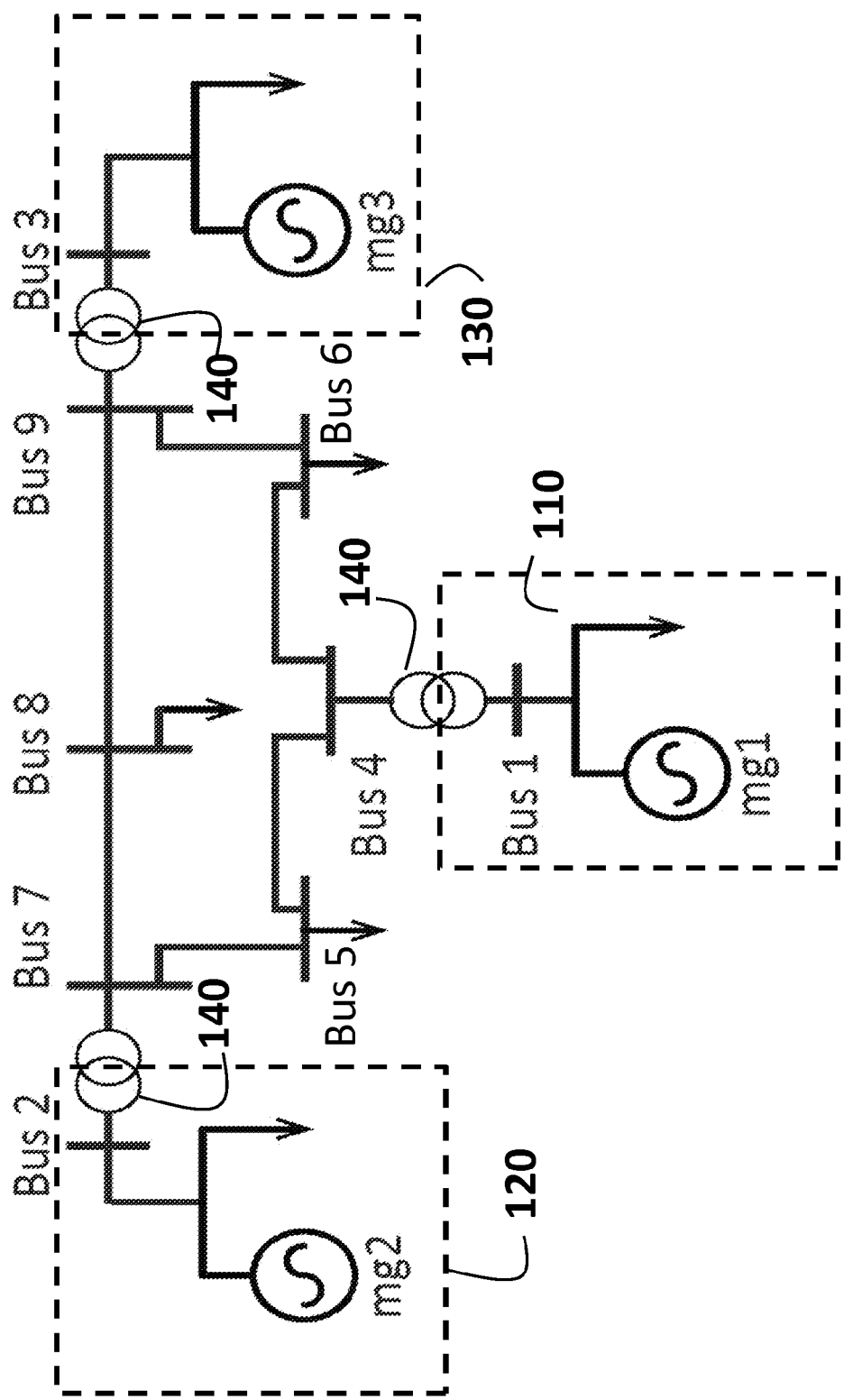
FIG. 1 is a schematic of a nine-bus power distribution network that connects three micro-grids according to embodiments of the invention.

FIG. 1 shows an example of micro-grid integrated power distribution networks in which the invention can operate. The network contains micro-grid connected buses, load buses and connection buses. The connection buses are actually transformers 140 between micro-grids and the power distribution network. The taps either at the low-voltage side, or the high-voltage side of each transformer are used to regulate the voltage at a point of common coupling (PCC) of each micro-grid. For some cases, a microgrid's PCC may be directly connected to a load/connection bus of the power distribution network through a transmission line and without voltage transforming.

Each tap change corresponds to a given amount, such as 1.25% of voltage magnitude variation, with a mechanical delay of several seconds. In addition, the PCC voltage of each micro-grid is regulated by an automatic controller, such as a droop controller, with its generation capacities. Similarly, the phase angle at each PCC can also be regulated by a droop controller for a fast inverter based generator, or whose dynamics are regulated by a swing equation for a rotational machine based generator. Depended on the generator installed at each micro-grid, the inertia of each micro-grid may be different.

For example, Bus 1 is connected to micro-grid 110 that has a rotational generator mg1 that has a large inertia. Bus 2 and Bus 3 are connected to micro-grids 120 and 130 that have a fast-inverter based droop controllers mg2 and mg3 which have small inertia values.

Real power generation capacities are different for the generation sources that are in each micro-grid. Similarly, each voltage droop controller at the micro-grid's PCC may not be the same, and accordingly a maximum reactive power support from each micro-grid is also different.

The static voltage stability margin and its future variation are determined based on information exchange between both sides of the connection link that connects a micro-grid's PCC to a bus of power distribution network. The connection link can be a transformer, or a transmission line. The invention can use any of the following measurement sets to predict the stability margins.

The first set of measurements includes: the voltage at the micro-grid's PCC, the voltage at the connection bus, the phase angle difference between the PCC and connection bus, and the power injection at the micro-grid's PCC. The other set of measurements include: the voltages at the micro-grid's PCC and the connection bus, the power injections from the micro-grid's PCC, and the powers flowing from the connection bus towards the micro-grid's PCC. Other than these local measurements, there is no global communication required for the distribution power network.

In most circumstances, the loads are supported by the local micro-grid. However, there are also some cases that the load increases beyond the local generation capacity. In urgent situations large loads can cause a voltage collapse, and control actions are required to shed loads or shunt devices to maintain a voltage stability in the micro-grid.

Power Balance Equations

The power networks are assumed to be three-phase balanced, and per unit (p.u.) values are used. Under these assumptions, the relationship between reactive power and voltage can be represented by an admittance matrix $Y_{n \times n}$ for an n-bus power network. If ignored, the impact of transformers' tap positions, the admittance matrix $Y_{n \times n}$ is a symmetric and complex matrix, and its components are:

$$Y_{ij} = \frac{-1}{z_{ij}}, \tag{1}$$

when bus i and bus j are connected, and $$Y_{ii} = -\sum_{j \neq i} Y_{ij} \tag{2}$$

where $z_{ij}$ is the impedance between bus i and bus j. The shunt admittance at bus i is not included in $Y_{n \times n}$, but considered as a shunt device in the load model. The admittance matrix $Y_{n \times n}$ can also be expressed as $G_{n \times n} + j B_{n \times n}$, where $G_{n \times n}$ is a conductance matrix and $B_{n \times n}$ is susceptance matrix. Similarly, each element can be expressed in a rectangular form as $Y_{ij} = G_{ij} + j B_{ij}$, or in a polar form as $Y_{ij} = |Y_{ij}| \angle \varphi_{ij}$, where $|Y_{ij}| = \sqrt{G_{ij}^2 + B_{ij}^2}$ and $\varphi_{ij} = \tan^{-1}(B_{ij}/G_{ij})$. Unbalanced situations can be analyzed by decomposing unbalanced vectors into three sets of symmetrical components and treating each set, respectively.

To define a single model for both generator bus and load bus, each bus connects a generator and a load. $P_{gen,i}$ and $Q_{gen,i}$ denote generated power; $P_{load,i}$ and $Q_{load,i}$ are real and reactive loads. At any bus i, $E_i$ is voltage magnitude and $\delta_i$ is phase angle of the voltage; $P_i$ and $Q_i$ are injected powers. Power flows at bus i, are then $$P_i = P_{gen,i} - P_{load,i}, \tag{3}$$

$$Q_i = Q_{gen,i} - Q_{load,i}. \tag{4}$$

Without power generations, a load bus j has $P_j + P_{load,i} = 0$, and $Q_j + Q_{load,i} = 0$.

On the basis of these definitions of states, power injections $P_i$ and $Q_i$ at any bus i are expressed in a power balance relationship as $$P_i = -E_i^2|Y_{ij}|\cos(\varphi_{ij}) + \sum_{j \neq i}[E_iE_j|Y_{ij}|\cos(\delta_i - \delta_j - \varphi_{ij})], \qquad (5)$$

$$Q_i = E_i^2|Y_{ij}|\sin(\varphi_{ij}) + \sum_{j \neq i}[E_iE_j|Y_{ij}|\sin(\delta_i - \delta_j - \varphi_{ij})]. \qquad (6)$$

These parameters are initially determined during configuration and planning for the power network. The parameters can vary subsequently due to control activities. Although it is possible in a power distribution system to maintain an update of the parameters, this is unrealistic for the entire power distribution network.

Load Model

A power distribution network or a micro-grid, may include various types of loads which can be generally represented using a ZIP load model as a polynomial load model. The ZIP model combines constant-impedance (Z), constant-current (I) and constant-power (P) components. Real and reactive loads at any bus i, are defined as functions of voltage magnitude $E_i$ (in p.u.) as $$P_{load,i} = E_i^2 P_{Z-load,i} + E_i P_{I-load,i} + P_{P-load,i}, \qquad (7)$$

$$Q_{load,i} = E_i^2 Q_{Z-load,i} + E_i Q_{I-load,i} + Q_{P-load,i}, \qquad (8)$$

where $P_{Z-load,i}$ and $Q_{Z-load,i}$ are nominal constant impedance loads, including shunt devices; $P_{I-load,i}$ and $Q_{I-load,i}$ are nominal constant-current loads, denoting devices that are modeled as current sources; $P_{P-load,i}$ and $Q_{P-load,i}$ are nominal constant-power loads, generally as a result of power control mechanism. As a result, the ZIP model represents a variety of loads and control devices.

Assumptions

In the invention, an n-bus power distribution network is modeled with m micro-grids and l pure load buses, so that n=m+l. It is assumed that each micro-grid connects to the power distribution network through its PCC at bus i to a pure load bus j. This assumption is made to simplify the power flow expression at a micro-grid's PCC so that an accurate voltage stability index can be determined, without approximation.

Figure 2:
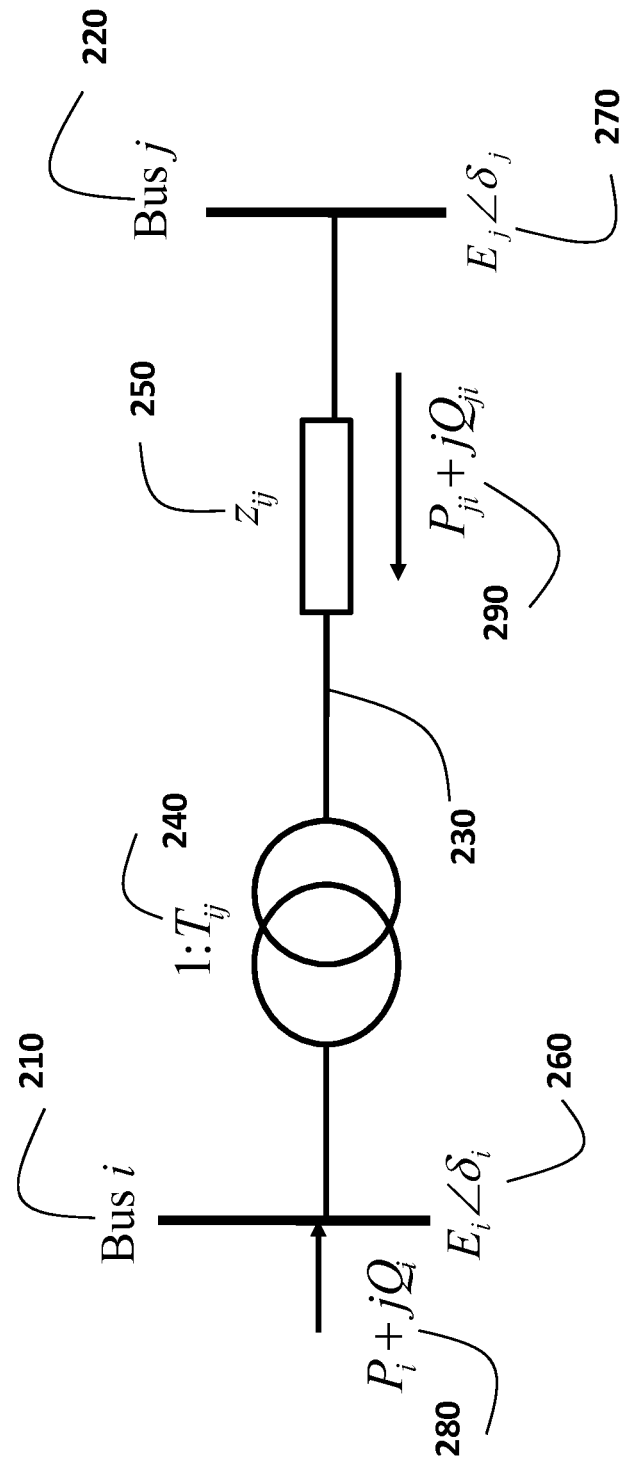
FIG. 2 is a schematic of a generalized branch model for a transformer with tap-changer that automatically regulates voltage magnitude at a point of common coupling (PCC) of a micro-grid.

FIG. 2 shows a generalized branch model for a transformer with tap changer 230. The transformer connects a bus i 210 to a bus j 220 through an ideal transformer. The transformer has a ratio 1:$T_{ij}$ 240 and an impedance $z_{ij}$ 250, where $T_{ij}$ is a real number, and $z_{ij}$ is a complex number. When the transformer ratio becomes 1, this branch model can also be used to represent a transmission line. Several measurements can be available for the transformer, including voltage and phase angle $E_i \angle \delta_i$ 260 at bus i voltage magnitude and phase angle $E_j \angle \delta_j$ 270 at bus j, real and reactive power injections $P_i + jQ_i$ 280 at bus i, and the real and reactive powers flowing, $P_{ji} + jQ_{ji}$ 290 from bus j towards bus i.

When the PCC at bus i is connected to a bus of the power distribution network, bus j through a transformer modeled as in FIG. 2, the power balance relationship in equations (5) and (6) can simplifies to $$P_i = T_{ij}^2 E_i^2|Y_{ij}|\cos(\varphi_{ij}) + T_{ij}E_iE_j|Y_{ij}|\cos(\delta_i - \delta_j - \varphi_{ij}), \qquad (9)$$

$$Q_i = T_{ij}^2 E_i^2|Y_{ij}|\sin(\varphi_{ij}) + T_{ij}E_iE_j|Y_{ij}|\sin(\delta_i - \delta_j - \varphi_{ij}), \qquad (10)$$

where $Y_{ij} = -1/z_{ij}$. Eq. (9-10) can also be used when the connection link is a transmission line by setting the transformer ratio to be 1, $T_{ij} = 1$.

Another assumption is that when voltage instability occurs in a micro-grid, its reactive power generation has reached a capacity limit. The assumption is based on the cause of the voltage collapse, i.e., insufficient reactive power support from the generators. If a local micro-grid has surplus reactive power capacity, then the local micro-grid is able to control its PCC voltage to prevent a voltage collapse.

After a micro-grid reaches its reactive power generation limit, either an upper or lower limit, the PCC converts from a voltage-regulated P-V bus to a P-Q bus without voltage control.

Droop Controllers

Static voltage stability analysis focuses on the relationship between reactive power flow and voltage magnitude. When a micro-grid has surplus reactive power capacity, it is able to control voltage either at a fixed magnitude or to a deviated value using a droop controller, leading to a P-V bus. For instance, a conventional droop controller can be used to manage voltage magnitude at a micro-grid's PCC, with the following dynamics $$\frac{dE_i}{dt} = (E_{ref,i} - E_i) - m_{Q,i}Q_{gen,i}, \qquad (11)$$

where $m_{Q,i}$ is a droop slope of the Q-E droop controller; $E_{ref,i}$ denotes voltage control command; $Q_{gen,i}$ is reactive power generation from the micro-grid. With such a droop controller, the amount of injected power from a micro-grid, i.e., $Q_{gen,i}$ is proportional to the voltage difference between $E_{ref,i}$ and $E_i$. The additional reactive power injection prevents voltage magnitude $E_i$ from further decreasing.

When reactive power generation $Q_{gen,i}$ saturates at its capacity limit $Q_{max,i}$, there is no more voltage regulation at the micro-grid-connected bus i, rendering a P-Q bus. Therefore, the micro-grid-connected bus is considered as a P-Q bus without voltage control. However, other micro-grids in the same power distribution network might provide voltage regulation. In this situation, voltage collapse still occurs, although the total reactive power generation limit has not been reached.

Similar to voltage regulation, phase angle at a micro-grid's PCC with fast inverter is controlled through a droop controller, whose dynamics are as follows $$\frac{d\delta_i}{dt} = m_{P,i}(P_{ref,i} - P_{gen,i}) + \omega_0, \qquad (12)$$

where $m_{P,i}$ is droop slope of the P-frequency droop controller; $P_{ref,i}$ denotes real power generation command; $\omega_0$ is the nominal angular frequency. With such a droop controller, the amount of injected power from a micro-grid, i.e., $P_{gen,i}$, is proportional to the frequency deviation from the nominal $\omega_0$ at bus i. If the micro-grid is based on a rotational generator, then phase angle dynamics are usually depicted by a swing equation as $$M_i\frac{d^2\delta_i}{dt^2} + D_i\frac{d\delta_i}{dt} = P_{ref,i} + D_i\omega_0 - P_{gen,i}, \qquad (13)$$

where $M_i$ is the machine's inertia and $D_i$ is the damping ratio at bus i.

Additionally, the dynamics of a rotational generator is equivalent to a fast inverter (used at a micro-grid's PCC) with low-pass filters. As a result, the phase angle dynamics of both electronic and rotational generators can be expressed using the same swing equations, but parameters vary for different generators. A rotational generator has large inertia $M_i$ but small damping ratio $D_i$, while $M_i$ and $D_i$ of a fast inverter are both small.

Determination of Parameters of the Connection Link

To derive a static voltage stability index, parameter of the connection link between the micro-grid's PCC and the connection bus of the distribution power network is determined based on real-time state measurements. The micro-grid's PCC is bus i, and the connected load bus in the power distribution network is bus j. Whether the connection link is a transmission line or a transformer with tap-changers as shown in FIG. 2, parameter of the connection link can be determined in real-time based on either one of measurement sets described below. Other than these local measurements, there is no global communication required for the distribution power network.

The first set of measurements includes real power injection at bus i, $P_i$, reactive power injection at bus i, $Q_i$, voltage magnitude at bus i, $E_i$, voltage magnitude at bus j, $E_j$ and phase angle difference between bus i and bus j, $(\delta_i - \delta_j)$. For a transmission-line link, its parameters, $|y_{ij}|$ and $\varphi_{ij}$ are determined as:

$$|Y_{ij}| = \frac{\sqrt{P_i^2 + Q_i^2}}{E_i\sqrt{E_i^2 + E_j^2 - 2E_iE_j\cos(\delta_i - \delta_j)}}, \quad (14)$$

$$\varphi_{ij} = \sin^{-1}\left(\frac{a_{Li}P_i + c_{Li}Q_i}{a_{Li}^2 + c_{Li}^2}\right), \quad (15)$$

where $a_{Li} = E_iE_j|Y_{ij}|\sin(\delta_i - \delta_j)$ and $c_{Li} = E_i^2|Y_{ij}| - E_iE_j|Y_{ij}|\cos(\delta_i - \delta_j)$. For a transformer with tap-changers that automatically regulate voltage magnitude, while $\varphi_{ij}$ is assumed to be $$\frac{\pi}{2},$$

the parameters includes $|Y_{ij}|$ and $T_{ij}$ as $$T_{ij} = \frac{E_j}{E_i}\left(\cos(\delta_i - \delta_j) + \sin(\delta_i - \delta_j)\frac{Q_i}{P_i}\right), \quad (16)$$

$$|Y_{ij}| = \frac{P_i}{T_{ij}E_iE_j\sin(\delta_i - \delta_j)}, \quad (17)$$

where $T_{ij}$ is the tap value of the transformer in FIG. 2.

The second set of measurements includes real power injection at bus i, $P_i$, reactive power injection at bus i, $Q_i$, voltage magnitude at bus i, $E_i$, real power flow from bus j to bus i, $P_{ji}$, reactive power flow from bus j to bus i, $Q_{ji}$ and voltage magnitude at bus j, $E_j$. Using the second set of measurements, the parameters for a transmission-line link, $|Y_{ij}|$ and $\varphi_{ij}$ are determined as:

$$\varphi_{ij} = \tan^{-1}\left(\frac{Q_{ji} + Q_i}{-P_{ji} - P_i}\right), \quad (18)$$

$$|Y_{ij}| = \frac{P_i^2 + Q_i^2}{E_i^2(b_{Li} + c_{Li})}, \quad (19)$$

where $b_{Li} = E_j^2|Y_{ij}| - E_iE_j|Y_{ij}|\cos(\delta_i - \delta_j)$ and $c_{Li} = E_i^2|Y_{ij}| - E_iE_j|Y_{ij}|\cos(\delta_i - \delta_j)$. For a transformer with tap-changers, its parameters, $|Y_{ij}|$, $\varphi_{ij}$ and $T_{ij}$ are determined according to:

$$\varphi_{ij} = \tan^{-1}\left(\frac{Q_{ji} + Q_i}{-P_{ji} - P_i}\right), \quad (20)$$

$$(\delta_i - \delta_j) = \tan^{-1}\left(\frac{a_{Ti}}{\frac{P_i^2 + Q_i^2}{b_{Ti} + c_{Ti}} - c_{Ti}}\right), \quad (21)$$

$$|Y_{ij}| = \frac{b_{Ti} + \frac{a_{Ti}}{\tan(\delta_i - \delta_j)}}{E_j^2}, \text{ and} \quad (22)$$

$$T_{ij} = \frac{a_{Ti}}{|Y_{ij}|E_iE_j\sin(\delta_i - \delta_j)}, \quad (23)$$

where $a_{Ti} = T_{ij}E_iE_j|Y_{ij}|\sin(\delta_i - \delta_j) =$
$\quad P_i\sin(\varphi_{ij}) + Q_i\cos(\varphi_{ij}) = -P_{ji}\sin(\varphi_{ij}) - Q_{ji}\cos(\varphi_{ij})$, $b_{Ti} = E_j^2|Y_{ij}| - T_{ij}E_iE_j|Y_{ij}|\cos(\delta_i - \delta_j) = Q_{ji}\sin(\varphi_{ij}) - P_{ji}\cos(\varphi_{ij})$, and $c_{Ti} = T_{ij}^2E_i^2|Y_{ij}| - T_{ij}E_iE_j|Y_{ij}|\cos(\delta_i - \delta_j) = Q_i\sin(\varphi_{ij}) - P_i\cos(\varphi_{ij})$.

Definition of Static Voltage Stability Margin Index

To derive a static voltage stability margin index for a micro-grid-connected bus, a reactive power balance relationship is derived at this bus, based on equations (8) and (10). For a micro-grid-connected bus i and its coupled load bus j, the reactive power flow relationship is $$Q_i = Q_{gen,i} - Q_{load,i} \quad (24)$$
$$= Q_{max,i} - E_i^2Q_{Z-load,i} - E_iQ_{I-load,i} - Q_{P-load,i}, \text{ and}$$
$$= T_{ij}E_iE_j|Y_{ij}|\sin(\delta_i - \delta_j - \varphi_{ij}) + T_{ij}^2E_i^2|Y_{ij}|\sin(\varphi_{ij})$$

Combining coefficients of polynomials on both sides of the equation, the following equation is obtained:

$$0 = a_iE_i^2 + b_iE_i + c_i, \quad (25)$$

where, $a_i = Q_{Z-load,i} + T_{ij}^2|Y_{ij}|\sin(\varphi_{ij})$ $b_i = Q_{I-load,i} + T_{ij}E_j|Y_{ij}|\sin(\delta_i - \delta_j - \varphi_{ij})$, $c_i = Q_{P-load,i} - Q_{max,i}$ The power flow relationship at any micro-grid-connected bus i, i.e., equation (25), provides a model to analyze static voltage stability in a micro-grid-connected power distribution network.

A static voltage stability margin index is defined for a micro-grid-connected power distribution network. Furthermore, the method according to the embodiments predicts the voltage stability margin after a forecast of future load variations is known.

To analyze the static voltage stability and identify a voltage stability margin index, reactive power flow into bus i, i.e., $Q_i$ is expressed in two second-order polynomial equations of voltage magnitude $E_i$ in (p.u.) as $$Q_i = -E_i^2Q_{Z-load,i} - E_iQ_{I-load,i} - Q_{P-load,i} + Q_{max,i} \quad (26)$$
$$= T_{ij}^2E_i^2|Y_{ij}|\sin(\varphi_{ij}) + T_{ij}E_iE_j|Y_{ij}|\sin(\delta_i - \delta_j - \varphi_{ij}).$$

Figure 3:
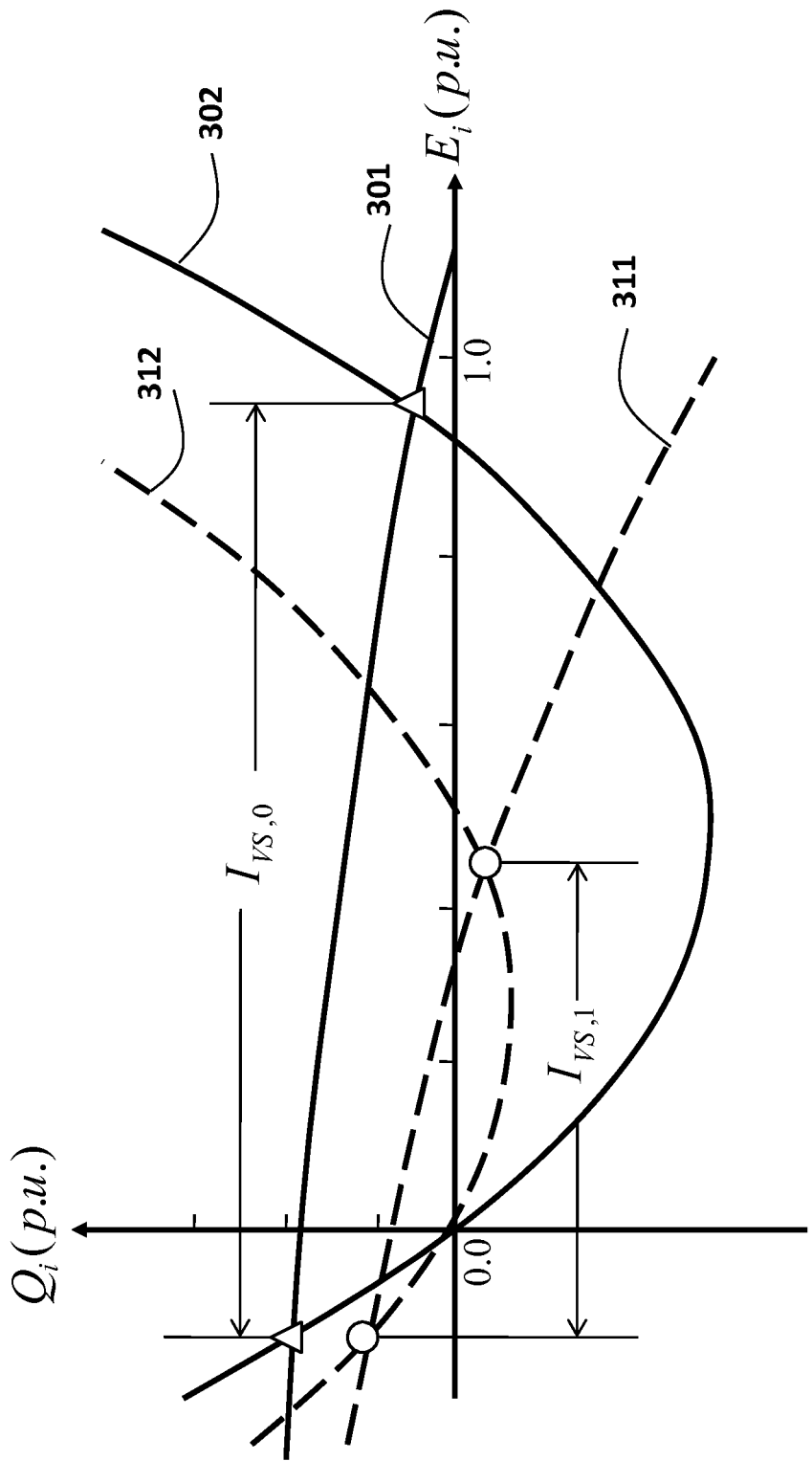
FIG. 3 are graphs of a reactive power injection curve and a reactive power flow curve, as functions of voltages, according to embodiments of the invention.

These two polynomials correspond to two quadratic curves in the $Q_i$-plane, as shown in FIG. 3.

As shown in FIG. 3, two different load situations are simulated at the same micro-grid-connected bus as a function of a reactive load Q and voltage magnitude E(p.u). For case 0 (triangle Δ) and case 1 (circle ○). Concave lines 301 and 311 in FIG. 3 are reactive power injection curves that represent upper portion of equation (26). Convex lines (302 and 312) are reactive power flow curves that depict lower portion of equation (26).

For the case with a light load, solid lines cross at a voltage magnitude about around 0.95 p.u., and reactive power injection value above zero, shown as the triangle Δ on the right. There is also an unfeasible solution with negative voltage value, represented by the triangle Δ on the left. When the load increases at the same micro-grid-connected bus, the dashed reactive power injection curve 311 shifts down, while the dashed reactive power flow curve 312 rises up. As a result, the operating point of the bus moves to the right circle ○ in FIG. 3, which corresponds to a large voltage decrease by more than 0.4 p.u. The unfeasible power flow solution at the left circle ○ also increases so that the gap between the two voltages becomes smaller. As load level continues to increase, it is reasonable to predict that the operating point disappears, i.e., a voltage collapse will occur.

With the a graphic depiction shown in FIG. 3, crossing points of the reactive power injection curve and the reactive power flow curve are related to equation (25). If $b_i^2 - 4a_i c_i > 0$, then equation (25) has two different real solutions $$E_{u,i} = \frac{-b_i + \sqrt{b_i^2 - 4a_i c_i}}{2a_i}, \text{ and} \tag{27}$$

$$E_{l,i} = \frac{-b_i - \sqrt{b_i^2 - 4a_i c_i}}{2a_i}. \tag{28}$$

When $b_i^2 - 4a_i c_i = 0$, the two real solutions converge to a single solution, i.e., $E_{u,i} = E_{l,i}$. Voltage collapse occurs when the power flow analysis provides no solution. This critical situation corresponds to $b_i^2 - 4a_i c_i = 0$. When there are two dissimilar real solutions, it is easy to identify that the larger solution $E_{u,i}$ to a stable voltage magnitude, while the smaller one $E_{l,i}$ is unstable.

As the power network approaches a state of voltage collapse, the value of $(b_i^2 - 4a_i c_i)$ decreases towards zero. The values of $\sqrt{b_i^2 - 4a_i c_i}$ is a good indication of a static voltage stability, but the values differs by a large amount from bus to bus, due to different load profile and network configuration. Because the two solutions $E_{u,i}$ and $E_{l,i}$ at bus i get close to each other when voltage becomes unstable, the difference of these two voltages, $$\frac{\sqrt{b_i^2 - 4a_i c_i}}{a_i}$$

is used as the index. As a voltage magnitude difference, the index has a clear physical meaning. In a power distribution network, we define a static voltage stability margin index $I_{VS,i}$ at bus i as $$I_{VS,i} = \frac{\sqrt{b_i^2 - 4a_i c_i}}{a_i}. \tag{29}$$

A large voltage stability margin index $I_{VS,i}$ indicates that the micro-grid-connected bus i can be connected to additional loads without causing a voltage collapse. In contrast, if $I_{VS,i}$ close to zero, then immediate action must be taken to prevent the entire power distribution network from collapsing.

Because the voltage magnitude usually decreases rapidly to the critical point of voltage collapse, a threshold value is used to initiate control actions, such as connecting shunt devices or even shedding loads in the micro-grid. Considering that fast inverter-based interfaces are usually controlled with a small time period, it is important to identify the impending voltage collapses in a timely manner. The voltage stability margin index defined above can be determined quickly for each micro-grid's PCC, so it can be used for real-time applications.

Voltage Stability Margin Index Prediction

Besides issuing a warning based on current measurement, it can be helpful to predict voltage stability in the near future based on the voltage stability margin index. Because the power flow relationship cannot be approximated by a linear function of future local load variations. A prediction based on a Taylor series expansion usually underestimates voltage decrease near the critical point.

Consequently, we use the relationship between $\Delta Q_{load,i}$ and $\Delta I_{VS,i}$ to predict the voltage stability margin index using a forecast of future local load variation at bus i in the micro-grid as $$\hat{I}_{VS,i}(t_{k+1}) = I_{VS,i}(t_k) + \Delta \hat{Q}_{load,i}(t_{k+1}) \frac{\Delta I_{VS,i}(t_k)}{\Delta Q_{load,i}(t_k)}, \tag{30}$$

where $\Delta I_{VS,i}(t_k)$ and $\Delta Q_{load,i}(t_k)$ are voltage stability margin index and reactive load variation over the time interval $t \in [t_{k-1}, t_k]$, and $\Delta \hat{Q}_{load,i}(t_{k+1})$ is the predicted reactive load variation in the time interval $t \in [t_k, t_{k+1}]$. Because the time interval is short for voltage stability prediction, these predicted values are accurate. Using $\hat{I}_{VS,i}(t_{k+1})$, it possible to determine whether its local load variation in the next time interval can cause the entire power distribution network to have a voltage collapse. If the predicted static voltage stability margin index violates a predetermined threshold, then the control actions must be initiated immediately.

The amounts associated with such control actions, either load shedding or shunt devices, can also be determined based on the static voltage stability margin index. With a predefined static voltage stability margin index threshold $\bar{I}_{VS,i}$, the minimal amount of constant-power load shedding or shunt device amount, $Q_{control,i}(t_{k+1})$ is determined as $$Q_{control,i}(t_{k+1}) = \frac{\Delta Q_{load,i}(t_k)}{\Delta I_{VS,i}(t_k)}(\bar{I}_{VS,i} - I_{VS,i}(t_k)). \tag{31}$$

This amount of local control action ensures static voltage stability at the micro-grid's PCC.

Figure 4:
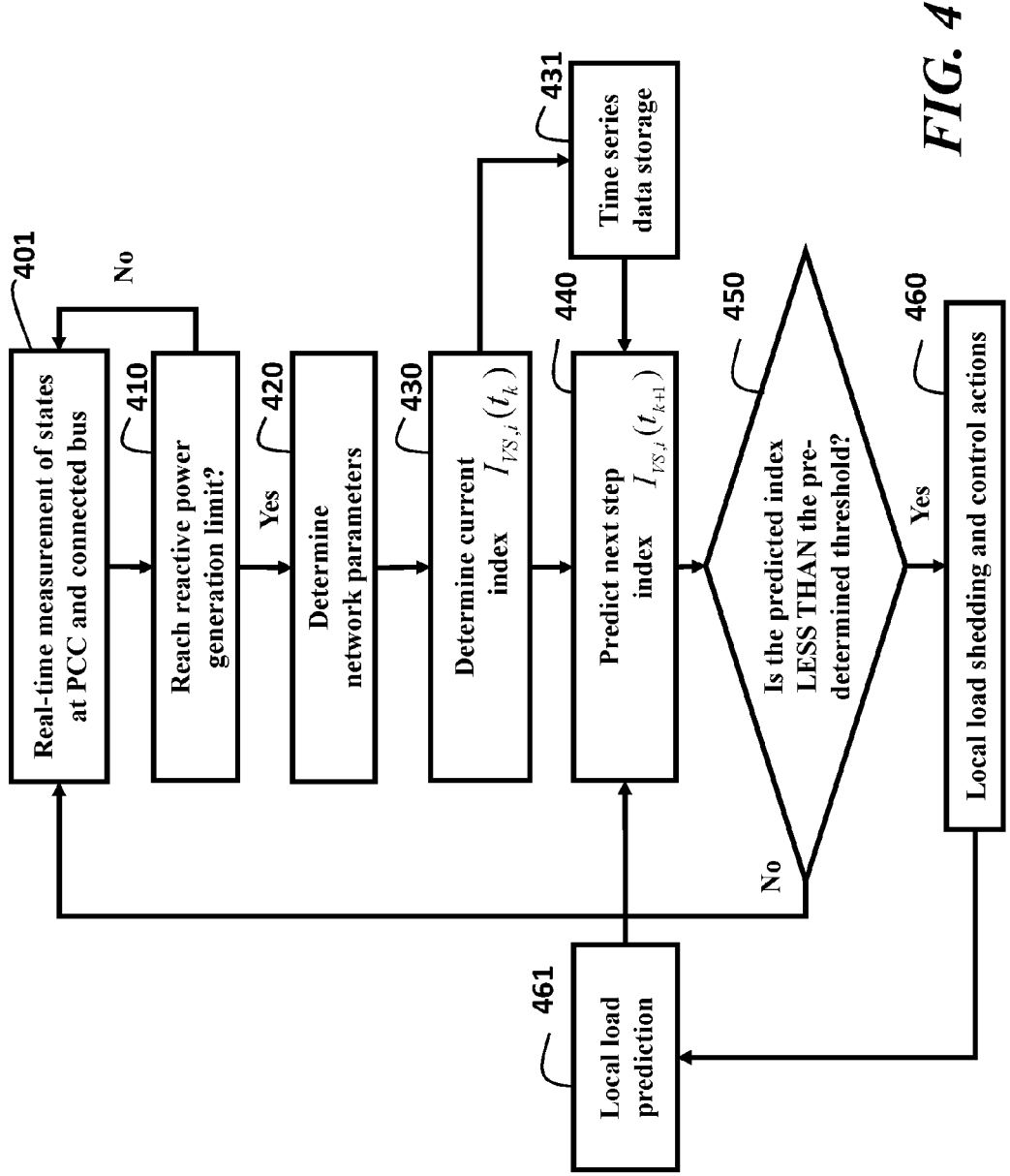
FIG. 4 is a flow diagram of a method for predicting a voltage collapse in a micro-grid according to embodiments of the invention.

FIG. 4 shows the method for predicting real-time static voltage stability margins in a micro-grid integrated power distribution network according to embodiments of the invention.

Voltage stability prediction begins with real-time measurement 401 at a point of common control (PCC) for a micro-grid connected bus and its connected bus in the power distribution network, where either $P_i$, $Q_i$, $E_i$, $E_j$ and $(\delta_i-\delta_j)$, or $P_i$, $Q_j$, $P_{ji}$, $Q_{ji}$, $E_i$ and $E_j$ are measured. Then, it is determined 410 whether the reactive power generation limit of the micro-grid is reached. If no, then the voltage is still regulated locally and there is no need to determine the voltage stability margin.

Otherwise, if yes, the voltage stability margin is determined as follows. Network parameters, such as $|Y_{ij}|$, $\varphi_{ij}$ and $T_{ij}$ of the connection link between the microgrid's PCC and connected bus of power distribution network, are determined 420 from the measurements so that any network changes, such as tap position change for a transformer link that might affect those measured states can be treated.

The current voltage stability margin index $I_{VS,i}(t_k)$ is determined 430 using the measurements and network parameters at time $t_k$. The current index $I_{VS,i}(t_k)$ is saved in a memory as time series 431 that can be used for voltage stability margin index prediction for a next time step $t_{k+1}$ 440. The voltage stability margin index is derived using equation (30) that takes a forecast of future local variations into account.

The predicted index is compared 450 with a pre-determined threshold to initiate necessary control actions to prevent a voltage collapse, such as local load shedding and shunting devices to maintain a voltage stability in the micro-grid, when the predicted index is less than the pre-determined threshold.

If the threshold is not violated, then the voltage stability predictor simply continues to monitor the index, and the predicted index is greater than the pre-determined threshold. If the threshold is reached, a control action is signaled indicating the voltage collapse. The control action can perform as load shedding in the micro-grid or connecting shunt devices to ensure a voltage stability in the micro-grid.

The above steps can be performed in a processor connected to memory, and to the coupling transformer by input/output interfaces using buses as known in the art. The method essentially transforms, in real-time states in a power distribution network to a signaled control action.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for predicting a voltage collapse in a micro-grid connected to a power distribution network, using at least one processor connected to at least one memory, at least one input interface and at least one output interface, the method is implemented via the processor comprising steps:
    measuring, in real-time, states at a point of common coupling (PCC) of the micro-grid, and a connected bus of the power distribution network connected to the micro-grid through a connection link;
    determining whether a reactive power generation limit of the micro-grid is reached based on the states at the PCC and the connected bus, if the reactive power generation limit is not reached, repeat monitoring the real-time measuring, until the reactive power generation limit is reached, then;
    determining, in real-time, parameters of the connection link using the measurements;
    determining, a real-time static voltage stability margin index based on the parameters of the connection link, and the states at the PCC and the connected bus, and store in the memory;
    predicting a future static voltage stability margin index using the stored real-time static voltage stability margin index in the memory, a forecast of future load variation in the microgrid, a real-time static voltage stability margin index variation, and a real-time load variation;
    determining whether the future static voltage stability margin index is less than a threshold indicative of a voltage collapse in the microgrid, if greater than the threshold, repeat monitoring the real-time measuring to maintain the voltage stability in the micro-grid, if less than the threshold, then;
    signaling a control action indicating an impending voltage collapse, via the at least one output interface, to maintain a voltage stability in the micro-grid;
    shunting devices in the micro-grid in response to the signaling of the control action to maintain the voltage stability in the micro-grid.

2. The method of claim 1, wherein the micro-grid is connected to a bus of power distribution network through a transmission line or a transformer with tap-changers.

3. The method of claim 2, wherein the transformer tap-changers are controlled automatically to manage voltage magnitude within an acceptable range.

4. The method of claim 1, wherein the PCC is one of a generator bus or a load bus.

5. The method of claim 1, wherein the parameters of the connection link are determined in real-time based on the states at terminal buses of the connection link.

6. The method of claim 5, wherein the states include real and reactive power injections at a terminal bus i, voltage magnitudes at the terminal bus i and a terminal bus j, and a phase angle difference between the terminal bus i and the terminal bus j, where the terminal bus i is at a micro-grid side of the connection link, and the terminal bus j is at a power distribution network side of the connection link.

7. The method of claim 5, wherein the states include real and reactive power injections at a terminal bus i, voltage magnitudes at the terminal bus i, real and reactive power flows from a terminal bus j towards the terminal bus i, and voltage magnitudes at the terminal bus j, where the terminal bus i is at a micro-grid side of the connection link, and the terminal bus j is at a power distribution network side of the connection link.

8. The method of claim 1, wherein the real-time static voltage stability margin index for a bus i, $I_{vs,i}$ is $$I_{VS,i} = \frac{\sqrt{b_i^2 - 4a_i c_i}}{a_i},$$

wherein $a_i = Q_{Z-load,i} + T_{ij}^2 |Y_{ij}| \sin(\varphi_{ij})$ $b_i = Q_{I-load,i} + T_{ij} E_j |Y_{ij}| \sin(\delta_i - \delta_j + \varphi_{ij})$, $c_i = Q_{P-load,i} - Q_{max,i}$ wherein $Q_{Z-load,i}$, $Q_{I-load,i}$ and $Q_{P-load,i}$ are a constant-impedance reactive load, a constant-current reactive load, and a constant-power reactive load at the bus i, $T_{ij}$ is a tap value of a transformer between the bus i and a bus j, $Y_{ij}$ is an element of an admittance matrix at a row and a column corresponding to the bus i and the bus j, $|Y_{ij}| = \sqrt{G_{ij}^2 + B_{ij}^2}$, $\varphi_{ij}=\tan^{-1}(B_{ij}/G_{ij})$, $G_{ij}$ and $B_{ij}$ are the real and imaginary parts of $Y_{ij}$, $E_j$ is voltage magnitude of the bus j, $\delta_i$ and $\delta_j$ are phase angles of the bus i and the bus j, $Q_{max,i}$ is a maximal reactive power generation from the bus i, where the bus i is at a micro-grid side of the connection link, and the bus j is at a power distribution network side of the connection link.

9. The method of claim 8, wherein the voltage collapse occurs when $b_i^2 - 4a_i c_i = 0$.

10. The method of claim 1, wherein the future static voltage stability margin index at a bus i, $\hat{I}_{VS,i}(t_{k+1})$ is predicted using the forecast of future load variation at the bus i in the micro-grid as $$\hat{I}_{VS,i}(t_{k+1}) = I_{VS,i}(t_k) + \Delta\hat{Q}_{load,i}(t_{k+1})\frac{\Delta I_{VS,i}(t_k)}{\Delta Q_{load,i}(t_k)},$$

wherein $I_{VS,i}(t_k)$ is the real-time static voltage stability margin index determined at $t_k$, $\Delta I_{VS,i}(t_k)$ and $\Delta Q_{load,i}(t_k)$ are the real-time static voltage stability margin index variation and the real-time load variation over a time interval $t \in [t_{k-1}, t_k]$ and $\Delta\hat{Q}_{load,i}(t_{k+1})$ is the future load variation in a time interval $t \in [t_k, t_{k+1}]$, where the bus i is at a micro-grid side of the connection link, $t_k$, $t_{k-1}$ and $t_{k+1}$ are a current time step, a previous time step, and a future time step, respectively.

11. The method of claim 1, further comprising:
determining a minimal load shedding amount, $Q_{control,i}(t_{k+1})$ that increases the real-time static voltage stability margin index above the threshold as:

$$Q_{control,i}(t_{k+1}) = \frac{\Delta Q_{load,i}(t_k)}{\Delta I_{VS,i}(t_k)}(\bar{I}_{VS,i} - I_{VS,i}(t_k)),$$

wherein $\bar{I}_{VS,i}$ is a future static voltage stability margin index threshold, $I_{VS,i}(t_k)$ is the real-time static voltage stability margin index determined at $t_k$, $\Delta I_{VS,i}(t_k)$ and $\Delta Q_{load,i}(t_k)$ are the real-time static voltage stability margin index variation and the real-time load variation over a time interval $t \in [t_{k-1}, t_k]$, $t_k$, $t_{k-1}$ and $t_{k+1}$ are a current time step, a previous time step, and a future time step, respectively.

12. The method of claim 1, further comprising:
shedding loads in the micro-grid in response to the signaling to maintain the voltage stability in the micro-grid.

13. The method of claim 1, wherein the at least one input interface receives data including the reactive power generation limit, the future static voltage stability margin index threshold, the forecast of future load variation, and stores the received data in the memory.

14. The method of claim 1, wherein the real-time static voltage stability margin index variation is determined as a difference of determined real-time static voltage stability margin indexes at a current time step and a previous time step.

15. A system for predicting a voltage collapse in a micro-grid connected to a power distribution network, using at least one processor connected to at least one memory that is connected to at least one input interface and at least one output interface, the at least one processor measures, in real-time, states at a point of common coupling (PCC) of the micro-grid, and a connected bus of the power distribution network connected to the micro-grid through a connection link, to determine whether a reactive power generation limit of the micro-grid is reached based on the states at the PCC and the connected bus, if the reactive power generation limit is not reached, and repeats monitoring the real-time measuring, until the reactive power generation limit is reached, then, determines, in real-time, parameters of the connection link using the measurements, the system comprising:

using the at least one processor to
determine, a real-time static voltage stability margin index, based on the parameters of the connection link and the states at the PCC and the connected bus, and stores in the at least one memory;
predict a future static voltage stability margin index using the stored real-time static voltage stability margin index, a forecast of future load variation in the micro-grid, a real-time static voltage stability margin index variation, and a real-time load variation;
determine, whether the future static voltage stability margin index is less than a threshold indicative of a voltage collapse in the microgrid, if greater than the threshold, repeat monitoring the real-time measuring to maintain the voltage stability in the microgrid, if less than the threshold, then;
signal a control action indicating an impending voltage collapse, via the at least one output interface, to maintain a voltage stability in the micro-grid;
shunt devices in the micro-grid in response to the control action signal to maintain the voltage stability in the micro-grid.

16. The system of claim 15, wherein the real-time static voltage stability margin index for a bus i, $I_{VS,i}$ is $$I_{VS,i} = \frac{\sqrt{b_i^2 - 4a_i c_i}}{a_i},$$

wherein $a_i = Q_{Z-load,i} + T_{ij}^2|Y_{ij}|\sin(\varphi_{ij})$ $b_i = Q_{I-load,i} + T_{ij}E_j|Y_{ij}|\sin(\delta_i - \delta_j + \varphi_{ij})$, $c_i = Q_{P-load,i} - Q_{max,i}$ wherein $Q_{Z-load,i}$, $Q_{I-load,i}$ and $Q_{P-load,i}$ are a constant-impedance reactive load, a constant-current reactive load, and a constant-power reactive load at the bus i, $T_{ij}$ is a tap value of a transformer between the bus i and a bus j, $Y_{ij}$ is an element of an admittance matrix at a row and a column corresponding to the bus i and the bus j, $|Y_{ij}|=\sqrt{G_{ij}^2+B_{ij}^2}$, $\varphi_{ij}=\tan^{-1}(B_{ij}/G_{ij})$, $G_{ij}$ and $B_{ij}$ are the real and imaginary parts of $Y_{ij}$, $E_j$ is voltage magnitude of the bus j, $\delta_i$ and $\delta_j$ are phase angles of the bus i and the bus j, $Q_{max,i}$ is a maximal reactive power generation from the bus i, where the bus i is at a micro-grid side of the connection link, and the bus j is at a power distribution network side of the connection link, wherein the voltage collapse occurs when $b_i^2 - 4a_i c_i = 0$.

17. A method for predicting a voltage collapse in a micro-grid connected to a power distribution network, using at least one processor connected to at least one memory that is connected to at least one input interface and at least one output interface, the method is implemented via the processor comprising steps:

measuring, in real-time, states at a point of common coupling (PCC) of the micro-grid, and a connected bus of the power distribution network connected to the micro-grid through a connection link;

determining whether a reactive power generation limit of the micro-grid is reached based on the states at the PCC and the connected bus, if the reactive power generation limit is not reached, repeat monitoring the real-time measuring, until the reactive power generation limit is reached, then;

determining, in real-time, parameters of the connection link using the measurements;

determining, a real-time static voltage stability margin index based on the parameters of the connection link, and the states at the PCC and the connected bus, and stored in the memory;

predicting a future static voltage stability margin index using the stored real-time static voltage stability margin index in the memory, a forecast of future load variation in the microgrid, a real-time static voltage stability margin index variation, and a real-time load variation, such that the real-time static voltage stability margin index variation is determined as a difference of determined real-time static voltage stability margin indexes at a current time step and a previous time step;

determining, whether the future static voltage stability margin index is less than a threshold indicative of a voltage collapse in the microgrid, if greater than the threshold, repeat monitoring the real-time measuring to maintain the voltage stability in the micro-grid, if less than the threshold, then;

signaling a control action indicating an impending voltage collapse, via the at least one output interface, to maintain a voltage stability in the micro-grid;

shunting devices in the micro-grid in response to the signaling of the control action to maintain the voltage stability in the micro-grid.

18. The method of claim 17, wherein the real-time static voltage stability margin index for a bus i, $I_{VS,i}$ is $$I_{VS,i} = \frac{\sqrt{b_i^2 - 4a_i c_i}}{a_i},$$

wherein $a_i = Q_{Z-load,i} + T_{ij}^2 |Y_{ij}| \sin(\varphi_{ij})$ $b_i = Q_{I-load,i} + T_{ij} E_j |Y_{ij}| \sin(\delta_i - \delta_j + \varphi_{ij})$, $c_i = Q_{P-load,i} - Q_{max,i}$ wherein $Q_{Z-load,i}$, $Q_{I-load,i}$ and $Q_{P-load,i}$ are a constant-impedance reactive load, a constant-current reactive load, and a constant-power reactive load at the bus i, $T_{ij}$ is a tap value of a transformer between the bus i and a bus j, $Y_{ij}$ is an element of an admittance matrix at a row and a column corresponding to the bus i and the bus j, $|Y_{ij}| = \sqrt{G_{ij}^2 + B_{ij}^2}$, $\varphi_{ij} = \tan^{-1}(B_{ij}/G_{ij})$, $G_{ij}$ and $B_{ij}$ are the real and imaginary parts of $Y_{ij}$, $E_j$ is voltage magnitude of the bus j, $\delta_i$ and $\delta_j$ are phase angles of the bus i and the bus j, $Q_{max,i}$ is a maximal reactive power generation from the bus i, where the bus i is at a micro-grid side of the connection link, and the bus j is at a power distribution network side of the connection link, wherein the voltage collapse occurs when $b_i^2 - 4a_i c_i = 0$.

19. A system for predicting a voltage collapse in a micro-grid connected to a power distribution network, using at least one processor connected to at least one memory that is connected to at least one input interface and at least one output interface, the at least one processor measures, in real-time, states at a point of common coupling (PCC) of the micro-grid, and a connected bus of the power distribution network connected to the micro-grid through a connection link, to determine whether a reactive power generation limit of the micro-grid is reached based on the states at the PCC and the connected bus, if the reactive power generation limit is not reached, and repeats monitoring the real-time measuring, until the reactive power generation limit is reached, then, determines, in real-time, parameters of the connection link using the measurements, the system comprising:

using the at least one processor to determine, a real-time static voltage stability margin index, based on the parameters of the connection link and the states at the PCC and the connected bus, and stores in the at least one memory;

predict a future static voltage stability margin index using the stored real-time static voltage stability margin index, a forecast of future load variation in the micro-grid, a real-time static voltage stability margin index variation, and a real-time load variation, wherein the future static voltage stability margin index at a bus i, $\hat{I}_{vs,i}(t_{k+1})$ is predicted using the forecast of future load variation at the bus i in the micro-grid as $$\hat{I}_{VS,i}(t_{k+1}) = I_{VS,i}(t_k) + \Delta \hat{Q}_{load,i}(t_{k+1}) \frac{\Delta I_{VS,i}(t_k)}{\Delta Q_{load,i}(t_k)},$$

wherein $I_{vs,i}(t_k)$ is the real-time static voltage stability margin index determined at $t_k$, $\Delta I_{vs,i}(t_k)$ and $\Delta Q_{load,i}(t_k)$ are the real-time static voltage stability margin index variation and the real-time load variation over a time interval (t $\in [t_{k-1}, t_k]$), and $\Delta \hat{Q}_{load,i}(t_{k+1})$ is the future load variation in a time interval t $\in [t_k, t_{k+1}]$, where the bus i is at a micro-grid side of the connection link, $t_k$, $t_{k-1}$ and $t_{k+1}$ are a current time step, a previous time step, and a future time step, respectively;

determine, whether the future static voltage stability margin index is less than a threshold indicative of a voltage collapse in the microgrid, if greater than the threshold, repeat monitoring the real-time measuring to maintain the voltage stability in the microgrid, if less than the threshold, then;

signal a control action indicating an impending voltage collapse, via the at least one output interface, to maintain a voltage stability in the micro-grid;

shunt devices in the micro-grid in response to the control action signal to maintain the voltage stability in the micro-grid.

\* \* \* \* \*